(12) United States Patent
Park

(10) Patent No.: US 7,751,182 B2
(45) Date of Patent: Jul. 6, 2010

(54) PORTABLE DISPLAY DEVICE

(75) Inventor: Jeong Min Park, Yongin-si (KR)

(73) Assignee: Samsung Mobile Display Co., Ltd., Yongin, Gyunggi-Do (KR)

( * ) Notice: Subject to any disclaimer, the term of this patent is extended or adjusted under 35 U.S.C. 154(b) by 499 days.

(21) Appl. No.: 11/603,097

(22) Filed: Nov. 22, 2006

(65) Prior Publication Data

US 2007/0115620 A1 May 24, 2007

(30) Foreign Application Priority Data

Nov. 23, 2005 (KR) ...................... 10-2005-0112569

(51) Int. Cl.
*G06F 1/16* (2006.01)
(52) U.S. Cl. ................................. 361/679.09
(58) Field of Classification Search ................. 361/680, 361/681; 349/58, 59, 60, 61, 67; 362/249
See application file for complete search history.

(56) References Cited

U.S. PATENT DOCUMENTS

| | | | | |
|---|---|---|---|---|
| 6,000,812 A * | 12/1999 | Freeman et al. | ............. | 362/249 |
| 6,220,723 B1 * | 4/2001 | Freeman et al. | ............. | 362/240 |
| 6,330,148 B1 * | 12/2001 | Won et al. | ..................... | 349/58 |
| 6,480,245 B1 * | 11/2002 | Sakamoto et al. | ............. | 349/58 |
| 6,762,807 B2 * | 7/2004 | Lee et al. | ....................... | 349/58 |
| 6,862,053 B2 * | 3/2005 | Lee et al. | ....................... | 349/58 |
| 7,106,393 B2 * | 9/2006 | Lee | ............................... | 349/58 |
| 7,113,237 B2 * | 9/2006 | Nitto et al. | ..................... | 349/58 |
| 7,292,290 B2 * | 11/2007 | Miyagawa et al. | ............. | 349/58 |
| 2001/0019377 A1 * | 9/2001 | Fukayama et al. | ............. | 349/58 |
| 2005/0286008 A1 * | 12/2005 | Miyagawa et al. | ........... | 349/158 |
| 2006/0098392 A1 * | 5/2006 | Sakurai | ....................... | 361/520 |
| 2006/0262241 A1 * | 11/2006 | Jeong | ............................ | 349/58 |
| 2007/0109462 A1 * | 5/2007 | Lee et al. | ....................... | 349/58 |

FOREIGN PATENT DOCUMENTS

| | | |
|---|---|---|
| KR | 10-0460406 | 11/2004 |
| KR | 10-2005-0065826 | 6/2005 |
| KR | 10-2005-0105038 | 11/2005 |

OTHER PUBLICATIONS

Korean Office Action for Korean Patent Application No. 2005-0112569, issued on Dec. 12, 2006.

* cited by examiner

*Primary Examiner*—Chandrika Prasad
(74) *Attorney, Agent, or Firm*—Robert E. Bushnell, Esq.

(57) ABSTRACT

A portable display device having improved durability includes: a mold frame mounting a first display panel and a back light assembly thereon; at least one printed circuit board, arranged on one surface of the mold frame, to supply control signals to the first display panel; and a protruding portion, surrounding and wrapping at least two sides of the at least one printed circuit board, and extending from at least two side surfaces of the mold frame, the at least two side surfaces of the mold frame being connected together.

18 Claims, 3 Drawing Sheets

PORTABLE DISPLAY DEVICE

CLAIM OF PRIORITY

This application makes reference to, incorporates the same herein, and claims all benefits accruing under 35 U.S.C.§119 from an application for PORTABLE DISPLAY DEVICE earlier filed in the Korean Intellectual Property Office on the 23 Nov. 2005 and there duly assigned Serial No. 10-2005-0112569.

BACKGROUND OF THE INVENTION

1. Field of the Invention

The present invention relates to a portable display device, and more particularly to a portable display device having improved durability with a transformed mold frame.

2. Description of the Related Art

Recently, several kinds of flat display devices have been developed, in which the weak points of Cathode Ray Tubes (CRTs), that is, the weight and the volume, have been reduced. Such flat display devices include Liquid Crystal Displays (LCDs), Field Emission Displays (FEDs), Plasma Display Panels (PDPs), and Light Emitting Displays, etc.

Liquid Crystal Displays are smaller and lighter and have a low power consumption, and are considered to be an alternative to overcome the weak points of CRTs. At present, the Liquid Crystal Display is mounted on portable devices, such as cellular phones and PDAs (Portable Digital Assistants) and so on and on monitors and TVs.

FIG. 1 is a schematic perspective view of a conventional portable display device. In FIG. 1, a dual display device, such as a cellular phone, includes at least one Liquid Crystal Display.

The conventional portable display device 50 includes a first display panel 5, a mold frame 10 receiving a back light assembly (not shown), etc., and at least one printed circuit board 20 mounted on a rear surface of a mold frame 10 and a second display panel 30 mounted on the printed circuit board 20.

The first display panel 5 is a Liquid Crystal Display panel having upper and lower substrates and having liquid crystal cells arranged in a matrix therebetween. A Thin Film Transistor (TFT) is included with each liquid crystal cell to shift video signals.

An integrated circuit (not shown) is arranged on one side of the first display panel 5, and data signals and scan signals are supplied from the integrated circuit. The first display panel 5 which received the data signals and scan signals, displays a picture image corresponding to the data signal and scan signal.

The back light assembly supplies the light to display the constant picture image on the first display panel 5. The back light assembly includes a light source (not shown). A mold frame 10 is included on the back light assembly, and the first display panel 5 and light source, etc., are fixed inside of the mold frame 10. Alignment tips 10a are formed on the right angle edges of the mold frame 10 to guide the position of the printed circuit board 20. The printed circuit board 20 receives drive signals from the drive circuit of the cellular phone (not shown).

The printed circuit board 20 includes a cellular phone connector 22. The cellular phone connector 22 interfaces with another connector which is coupled to the driving circuit of the cellular phone, and receives the driving signals from the driving circuit of the cellular phone.

The printed circuit board 20 which receives the driving signals produces multiple control signals corresponding to the driving signals.

The control signals produced in the printed circuit board 20 are supplied to the first display panel 5 and light source and so on, and provides the constant picture image on the first display panel 5

Grooves corresponding to the alignment tips 10a on the mold frame 10 are formed on the printed circuit board 20. The grooves on the printed circuit board 20 are formed on the rectangular edge of the printed circuit board 20 and the alignment tips 10a are projected about as high as the printed circuit board 20.

Likewise, if, the grooves on the printed circuit board 20 are located on the alignment tips 10a, the printed circuit board 20 and the mold frame 10 can be attached in an array.

The second display panel 30 is connected to the printed circuit board 20 on a rear surface of the printed circuit board 20 and displays a picture image. The second display panel 30 is either an Organic Light Emitting Display panel or a Liquid Crystal Display panel.

In accordance with the trends of minimization and slimming of the portable device, the total thickness of the display device is decreasing and protection elements which are not used to drive the display device have been being removed, which cause slimming of the portable display device as whole. However, the slimming weakens the durability of the portable display device and causes frequent faults and destruction thereof. Accordingly, a structural method to improve the durability without increasing the thickness of the portable display device has been sought.

SUMMARY OF THE INVENTION

Considering the above mentioned problem, an object of the present invention is to provide a portable display device having improved durability with a transformed mold frame.

These and other objects of the present invention can be achieved by providing a portable display device including: a mold frame mounting a first display panel and a back light assembly thereon; at least one printed circuit board, arranged on one surface of the mold frame, to supply control signals to the first display panel; and a protruding portion, surrounding and wrapping at least two sides of the at least one printed circuit board, and extending from at least two side surfaces of the mold frame, the at least two side surfaces of the mold frame being connected together.

The protruding portion preferably extends to connect three sides of the mold frame together.

An extending height of the protruding portion is preferably equal to or less than a thickness of a side surface of the at least one printed circuit board.

The at least one printed circuit board preferably corresponds to the protruding portion to be accommodated inside of the protruding portion.

The portable display device preferably further includes at least one of the first display panel or other display panels being connected to the at least one printed circuit board.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 2:
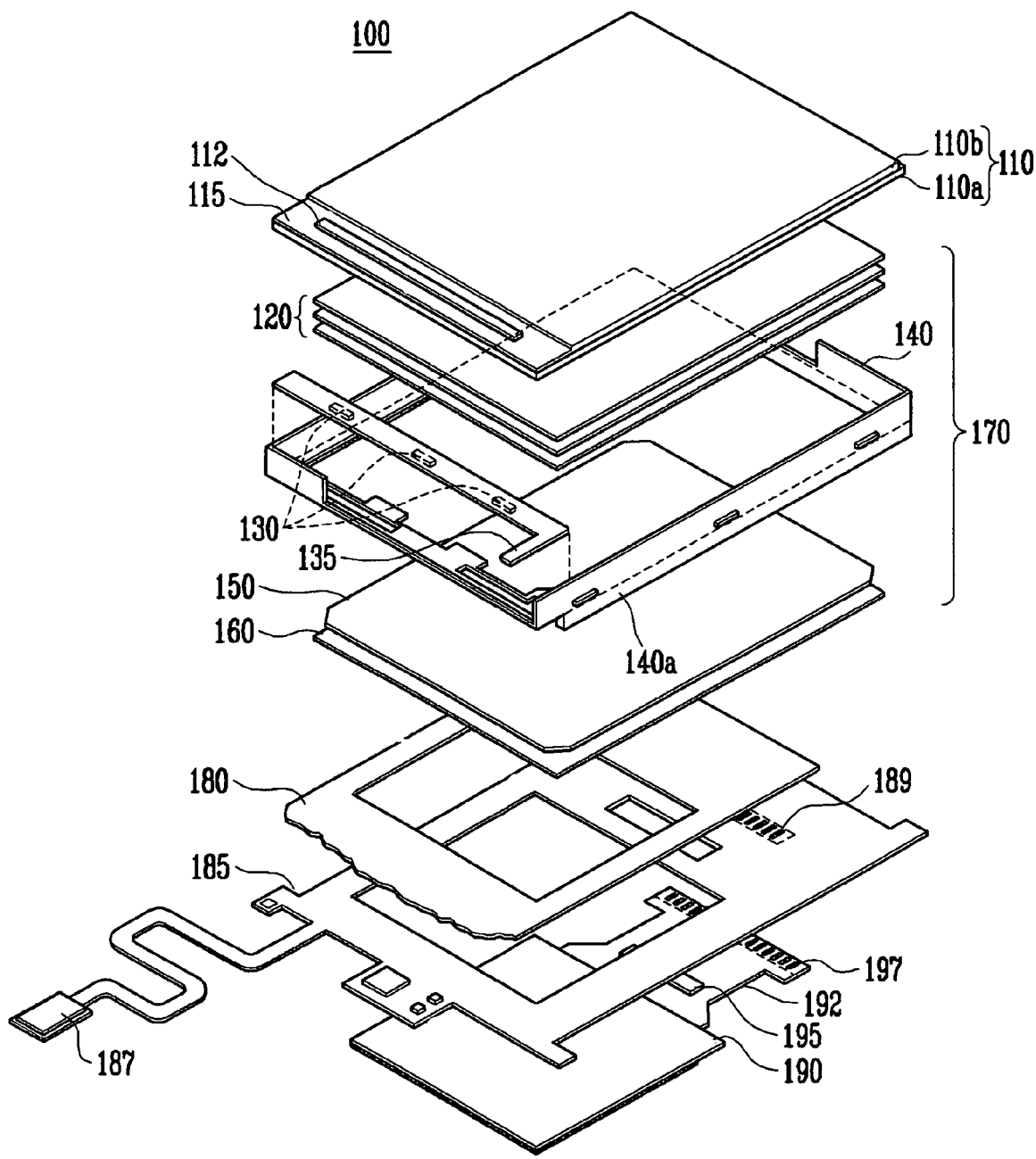
FIG. 2 is an exploded perspective view of a portable display device according to an exemplary embodiment of the present invention.

FIG. 2 is an exploded perspective view of a portable display device according to an exemplary embodiment of the present invention.

In FIG. 2, a dual display device, such as a cellular phone, includes at least one Liquid Crystal Display. The construction and arrangement of the portable display device is only exemplary and the present invention is not limited thereto.

Referred to FIG. 2, a portable display device 100 includes a first display panel 110, a back light assembly 170, a first printed circuit board 180, a second printed circuit board 185 and second display panel 190.

Referring to FIG. 2, the first display panel 110 is a liquid crystal display panel; the second display panel 190 is an organic light emitting display panel. The first display panel 110 has broader picture surface to display more information than the second display panel 190. As an example, the first display panel 110 is used as an internal window of the cellular phone folder and the second display panel 190 is used as an external window of the cellular phone folder.

In this case, the first display panel 110 displays information of message receipt breakdown and communication information etc., and the second display panel 190 displays relatively information of date and time, etc. The first display panel 110 includes an integrated circuit 112, first substrate 110a, second substrate 110b and a liquid crystal material which injected in between the first substrate 110a and second substrate 110b.

The first substrate 110a contains multiple Thin Film Transistors (TFTs) positioned in a matrix. The source electrodes of the TFTs are connected to the data lines and the gate electrodes are connected to the scan lines. The drain electrodes of the TFTs are connected to pixel electrodes formed of electro-conductive transparent Indium-Tin Oxide (ITO).

The TFTs are turned on when the scan signal is provided by the scan lines and provide the pixel electrodes with the data signals. The integrated circuit 112 provides the TFTs with scan signals and data signals at the appropriate time. A protection layer 115 is formed around the integrated circuit 112. The second substrate 110b is located corresponding to the first substrate 110a. A common electrode formed of ITO is located in front of the second substrate 110b, A predetermined voltage is provided to the common electrode and an electric field corresponding to the voltage is formed in between the pixel electrode and the common electrode.

According to the electric field, the arrangement angle of the liquid crystal injected in between the first substrate 110a and the second substrate 110b, is changed and due to the changed arrangement angle, it displays the desired images by the changed light transmission.

The back light assembly 170 contains light emitting diodes 130, a light emitting diode board 135, a Light Guide Plate (LGP) 150, a reflection plate 160, optical sheets 120, and a mold frame 140 to contain them therein. The light emitting diodes 130 produce light of a predetermined brightness corresponding to the driving signals from the light emitting diode board 135. While light emitting diodes 130 are illustrated as a light source, other light sources, such as lamps, can be used.

Also, the number of light emitting diodes 130 can be varied. The light emitting diode board 135 is connected to the first printed circuit board 180, and corresponds to the control signals provided by the first printed circuit board 180. The light emitting diode board 135 then provides the light emitting diodes 130 with the driving signals. The LGP 150 provides the first display panel 110 with the light from the light emitting diodes 130.

The LGP 150 transmits the light from its side, as a planar light of the first display panel 110 area.

The reflection plate 160 provides the optical sheets 120 with the light from the LGP 150.

The optical sheets 120 provide the first display panel 110 with the light after enhancing uniformity and/or luminance of the light from the LGP 150.

The mold frame 140 fixes the light emitting diodes 130, the LGP 150, the light emitting diode board 135, the reflection plate 160, and the optical sheets 120. The mold frame 140 contains the protruding portion 140a which extends from at least two sides, to the first and the second printed circuit board 180 and 185 to connect each other.

Figure 3:
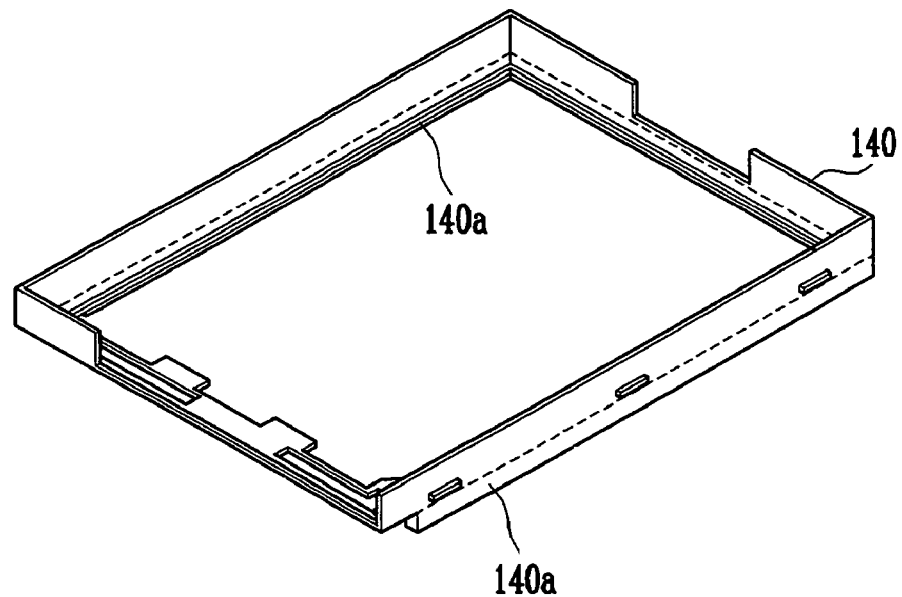
FIG. 3 is a view of the mold frame of FIG. 2.

For instance, the protruding portion 140a, as illustrated in FIG. 3, can be extended to be connected from three sides of the mold frame 140.

The protruding portion 140a guides an adhesion site to attach the first and the second printed circuit board 180 and 185 to the mold frame 140.

Figure 1:
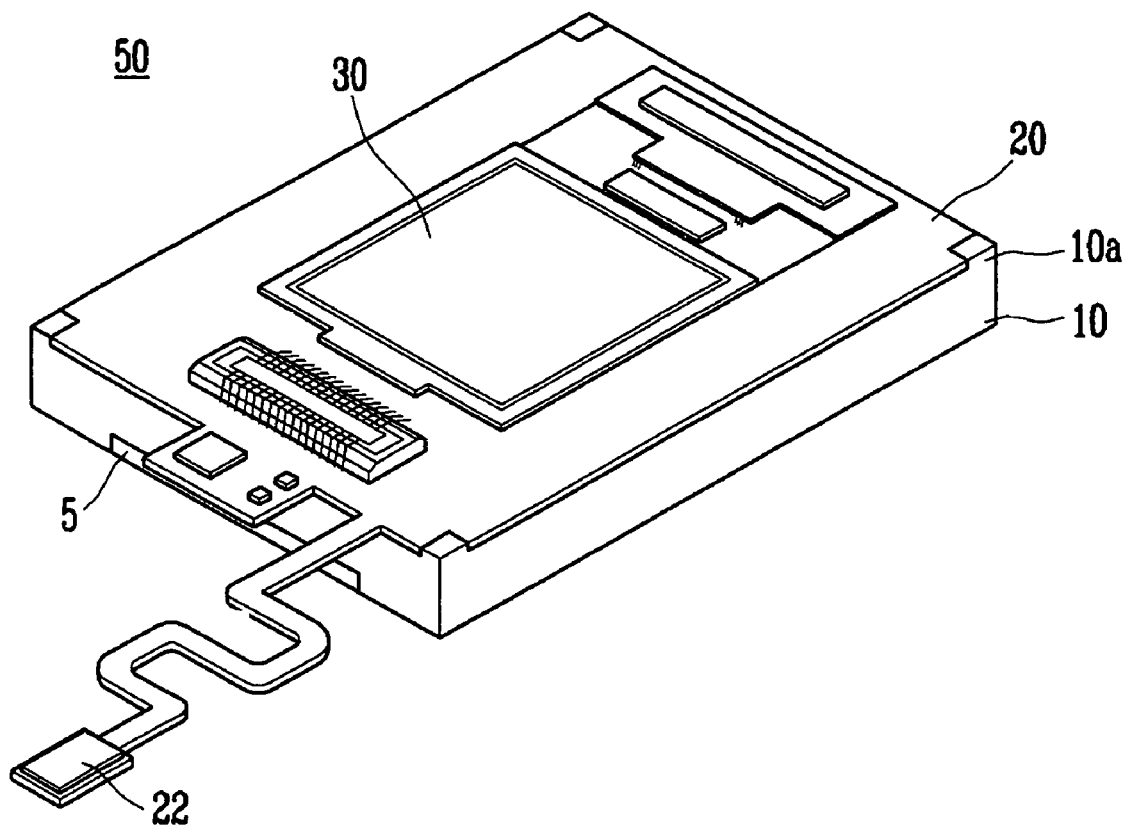
FIG. 1 is a schematic perspective view of a conventional portable display device.

Unlike the conventional tip 10a of FIG. 1, the protruding portion 140a extends to be connected to three sides of the mold frame 140, and is therefore damaged less frequently than the conventional tip 10a of FIG. 1.

Also, the protruding portion 140a, formed on the three sides, is formed to be connected with each other with a ⊂ shape, and is formed to wrap three sides of the first and second printed circuit boards 180 and 185 when the first and second printed circuit board 180 and 185 are attached.

So as not to increase the thickness of the portable display device 100, the thickness of the protruding portion 140a is the same as or less than the thickness of the first and second printed circuit boards 180 and 185 attached thereto, that is, the sum of the side thickness of the first and second printed circuit boards 180 and 185.

Since the edge thickness of the mold frame 140 is increased after the protruding portion 140a is formed, the stress concentrated on the edge is decreased, and the details thereof are described later. While the protruding portion 140a is formed to extend from three sides of the mold frame 140, it is only for illustration purposes and the present invention is not limited thereto.

For example, the protruding portion 140a may be extended to connect four side surfaces of the mold frame 140 with each other. In this case, a groove, opening, etc., can be formed where the cellular phone connector 187 is located.

Also, the thickness of the protruding portion 140a is the same or less than the sum of the side thickness of the first and second printed circuit boards 180 and 185. However, it can be formed so as not to exceed the total side thickness of the first and second printed circuit boards 180 and 185 and the second display panel 190.

The second printed circuit board 185 receives the driving signals from the driving circuit (not shown) of the cellular phone.

To do this, the second printed circuit board 185 contains the cellular phone connector 187. The cellular phone connector 187 is combined with another connector attached to the driving circuit in the cellular phone and receives the driving signals from the driving circuit in the cellular phone.

The second printed circuit board 185 receiving driving signals produces variable control signals corresponding to the driving signals provided thereto. The first printed circuit board 180 is connected to the second printed circuit board 185 through a first pad 189 formed on the second printed circuit board 185. The first printed circuit board 180 is connected to the integrated circuit 112 of the first display panel 110 and the light emitting diode board 135 by a flexible printed circuit board (not shown).

The first printed circuit board 180 connected to the integrated circuit 112 and the light emitting diode board 135 drives the integrated circuit 112 and the light emitting diode board 135 corresponding to the control signals supplied from the second printed circuit board 180.

The edges of the first and second printed circuit boards 180 and 185 are molded to correspond to the protruding portion 140a of the mold frame 140.

The second display panel 190 is formed with an organic light emitting display panel. The second display panel 190 is connected to a flexible printed circuit board 192, and the flexible printed circuit board 192 is connected to the second printed circuit board 185 through a second pad 197. The flexible printed circuit board 192 contains an integrated circuit 195, and the integrated circuit 195 drives the second display panel 190 corresponding to the control signals supplied by the second printed circuit board 185, and the second display panel 190 then displays an image.

The second display panel 190 can be formed as a Liquid Crystal Display panel. In this case, multiple optical sheets may be formed in between the light guide plate 150 and the second display panel 190 and there may be an opening corresponding to the second display panel 190 within the first and second printed circuit boards 180 and 185.

Also, while not illustrated in FIG. 2, the portable display device 100 may contain a chassis installed in the upper and lower portions of the mold frame 140.

Figure 4:
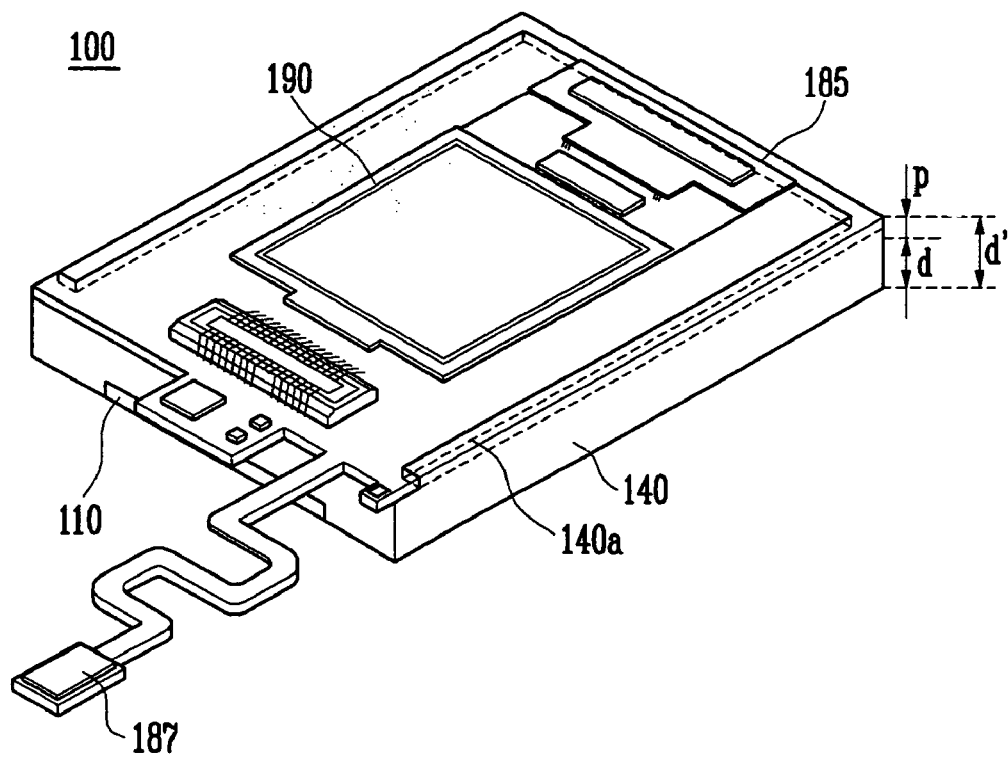
FIG. 4 is a rear perspective view of an assembled portable display device of FIG. 2.

FIG. 4 is a rear perspective view of an assembled portable display device of the FIG. 2.

Referring to FIG. 4, the second printed circuit board 185 which wrapped the side surface by the extended protruding portion 140a with a ⊂ shape on three side surfaces of the mold frame 140, is attached to the mold frame 140 by double-sided adhesive tape, etc., while, the side surface thickness of the protruding portion 140a is no more than the sum of thickness of first and second printed circuit boards 180 and 185 and second display panel 190.

Thus, the protruding portion 140a is formed with surrounding wrapped three side surfaces of the second printed circuit board 185, the thickness of the mold frame 140 which formed the protruding portion 140a is increased as much as the thickness p of the protruding portion 140a. That is, the side surface thickness d' is the sum of the side surface thickness d of the mold frame 140 and the thickness p of the protruding portion 140a.

The side surface of mold frame 140 corresponding to the side surface of second printed circuit board 185 which formed the connector 187 of cellular phone, is not formed with the protruding portion 140a, and thus, is easier to align.

Generally, the stress applied from the external portion, is concentrated on the side surface edge portion, and while, the durability of the mold frame 140 is improved by increasing of the side thickness thereof. The stress, which added to the mold frame 140, is decreased, against the same external power according to increasing of the thickness of mold frame 140, and thus, the displacement is decreased also and therefore, the durability of the mold frame 140 is improved.

Therefore, the durability of the portable display device 100 is improved.

Also, the first and second printed circuit boards 180 and 185 are molded to be attachable on the inside of the protruding portion 140a, the side surface thickness of the protruding portion 140a is no more than the sum of thickness of the first and second printed circuit boards 180 and 185 and second display panel 190, and thus, the whole thickness d' of portable display 100 is not increased, even if increasing of the side thickness of the mold frame 140.

As described above, according to the exemplary embodiment of the present invention, even if the whole thickness of the portable display device 100 is maintained same, the durability of the portable display device is improved by the change of the figure of the mold frame 140 and first and second printed circuit boards 180 and 185 which are mounted on the mold frame 140.

Thus, in the portable display device according to the present invention, the durability of the portable display device is improved through the change of the figure of printed circuit board which is mounted in alignment with wrapping the side surfaces by the protruding portion on the inside and the protruding portion which is formed on the mold frame.

Although an exemplary embodiment of the present invention has been described for illustrative purposes, those skilled in the art will appreciate that various modifications, additions and substitutions are possible, without departing from the scope and spirit of the invention as defined by the accompanying claims.

What is claimed is:

1. A portable display device, comprising:
a first display panel for displaying an image;
a light emitting diode disposed below the first display panel;
a mold frame, side surfaces of the mold frame surrounding the first display panel and the light emitting diode;
at least one printed circuit board disposed below the light emitting diode, the at least one printed circuit board supplying control signals to the first display panel; and
a protruding portion extending from at least two of the side surfaces of the mold frame in a direction substantially parallel to one of the side surfaces of the mold frame, the protruding portion surrounding the at least one printed circuit board, the at least two of the side surfaces of the mold frame being connected together, a thickness of the protruding portion being equal to or less than a side thickness of the at least one printed circuit board.

2. The portable display device as set forth in claim 1, wherein the protruding portion extends to connect three sides of the mold frame together.

3. The portable display device as set forth in claim 1, further comprising a second display panel being connected to the at least one printed circuit board.

4. The portable display device as set forth in claim 1, further comprising a light guide plate disposed between the first display panel and the at least one printed circuit board, the light guide plate providing light from the light emitting diode to the first display panel.

5. The portable display device as set forth in claim 4, further comprising an optical sheet disposed between the light guide plate and the first display panel, the optical sheet providing light from the light guide plate to the first display panel.

6. A portable display device, comprising:
a first display panel for displaying an image;
a light emitting diode for emitting light towards the first display panel;
a mold frame containing the first display panel and the light emitting diode, side surfaces of the mold frame surrounding the first display panel and the light emitting diode;
a printed circuit board disposed below the light emitting diode, the printed circuit board supplying control signals to the first display panel; and
a protruding portion extending from the mold frame in a direction substantially parallel to one of the side surfaces of the mold frame, the protruding portion surrounding the printed circuit board, a thickness of the protruding portion being equal to or less than a side thickness of the printed circuit board.

7. The portable display device as set forth in claim 6, wherein a protruding portion downwardly extends from at least two side surfaces of the mold frame.

8. The portable display device as set forth in claim 6, wherein side surfaces of the mold frame are all connected to enclose both of the first display panel and the light emitting diode.

9. The portable display device as set forth in claim 6, further comprising a second display panel, the printed circuit board being disposed between the first display panel and the second display panel, the second display panel being connected to the printed circuit board.

10. The portable display device as set forth in claim 9, wherein the printed circuit board has an opening through which light emitted from the light emitting diode transmits towards the second display panel.

11. The portable display device as set forth in claim 6, further comprising a reflection plate that is disposed between the first display panel and the printed circuit board.

12. The portable display device as set forth in claim 6, further comprising another printed circuit board disposed between the light emitting diode and the printed circuit board, the light emitting diode being connected to the another printed circuit board.

13. A portable display device, comprising:
a first display panel for displaying an image;
a light emitting diode disposed under the first display panel for emitting light towards the first display panel;
a mold frame accommodating the first display panel and the light emitting diode, side surfaces of the mold frame surrounding the first display panel and the light emitting diode;
a printed circuit board disposed below the light emitting diode, the printed circuit board supplying control signals to the first display panel;
a protruding portion extending from the mold frame in a direction substantially parallel to one of the side surfaces of the mold frame, the protruding portion covering at least two side surfaces of the printed circuit board; and
a second display panel disposed below the printed circuit board, the second display panel being connected to the printed circuit board.

14. The portable display device as set forth in claim 13, wherein a thickness of the protruding portion is equal to or smaller than a side thicknesses of the printed circuit board.

15. The portable display device as set forth in claim 13, wherein side surfaces of the mold frame are all connected to enclose both of the first display panel and the light emitting diode.

16. The portable display device as set forth in claim 13, wherein the printed circuit board has an opening through which light emitted from the light emitting diode transmits towards the second display panel.

17. The portable display device as set forth in claim 13, further comprising a reflection plate that is disposed between the first display panel and the printed circuit board.

18. The portable display device as set forth in claim 13, further comprising another printed circuit board disposed between the light emitting diode and the printed circuit board, the light emitting diode being connected to the another printed circuit board.

* * * * *